United States Patent [19]
Matsuo

[11] 3,887,959
[45] June 10, 1975

[54] APPARATUS FOR SEPARATION OF AIR AND DUST

[76] Inventor: Susumu Matsuo, Minamitsushuki 196 Chasen Cho, Shizuoka, Japan

[22] Filed: May 14, 1974

[21] Appl. No.: 469,812

[52] U.S. Cl. .................. 15/347; 15/409; 55/385; 55/418; 55/467; 55/DIG. 14
[51] Int. Cl. ............................................. A47l 9/10
[58] Field of Search ....... 55/17, 356, 392, 418, 434, 55/439, 467, 472, DIG. 3, DIG. 8, DIG. 14, 385, 409; 15/78, 83, 340, 347, 409

[56] References Cited
UNITED STATES PATENTS

| | | | |
|---|---|---|---|
| 2,313,019 | 3/1943 | Lohse | 55/434 |
| 2,607,439 | 8/1952 | Dickens et al. | 55/17 |
| 2,842,225 | 7/1958 | Wahlborg | 55/356 X |
| 3,173,777 | 3/1965 | Tamny | 15/83 X |
| 3,780,502 | 12/1973 | Dupre et al. | 55/356 X |

FOREIGN PATENTS OR APPLICATIONS

| | | | |
|---|---|---|---|
| 119,307 | 7/1947 | Sweden | 55/356 |
| 970,674 | 9/1964 | United Kingdom | 15/340 |

Primary Examiner—Frank W. Lutter
Assistant Examiner—Kathleen J. Prunner
Attorney, Agent, or Firm—Kurt Kelman

[57] ABSTRACT

This invention relates to an apparatus for separating dust and other matter from air. More particularly, the present invention relates to a simple apparatus which, by utilizing a vacuum source, gravitational force, the inertia of the dust and air currents only, separates and collects 98% of the whole amount of dust sucked in conjunction with air without requiring the use of a filter or any other similar separating means.

The essence of this invention resides in providing a closed dust hopper having an air discharge hole in a wall thereof, the discharge hole being connected to a vacuum source and having a flange projecting into the hopper, and an air and dust injection nozzle positioned within the air discharge hole, projecting into the hopper to a lesser extent than the flange, and being coaxial with the air discharge hole and connected through a duct to a dust collecting means. The cross sections of the air discharge hole and the injection nozzle are similar in shape and the cross sectional area of the injection nozzle is half the cross sectional area of the air discharge hole. A tubular member disposed within the hopper in front of the injection nozzle and coaxial thereto, is spaced from the flange of the air discharge hole so as to guide the injected current of air into the hopper and so that floating dust particles present in the air to be discharged through the air discharge hole from the hopper are made to fly into the injected current of air and returned to the hopper, with the result that air alone is allowed to advance toward the vacuum source.

2 Claims, 2 Drawing Figures

PATENTED JUN 10 1975 3,887,959

APPARATUS FOR SEPARATION OF AIR AND DUST

BACKGROUND OF THE INVENTION

This invention relates to an apparatus for separating dust, suspended particles, etc. (hereinafter referred to collectively as "dust") from air. In practically all the conventional vacuum-cleaning devices, the dust present in the sucked air is separated from the air by passing the air as sucked in through one or another of various types of filters. With household cleaners, such filters will suffice since the amounts of the dust to be separated are manageably small. In the case of road sweepers and similar devices, however, large amounts of various kinds of dust must be disposed of so that filters will be deprived of their function after several hours of service because of clogging. Elaborate devices have been developed to overcome the trouble as by, for example, incorporating a number of filters of different mesh size coupled with a means for imparting vibration thereto or mounting a voluminous water reservoir coupled with a highpressure pump for incessantly spraying water onto the filter face. Consequently, road sweepers inevitably have large weight and volume, are expensive and require high operating cost. Moreover, they are difficult to handle and maintain, develop frequent mechanical troubles and have poor operating efficiency.

A main object of this invention is to provide a vacuum type apparatus for separating air and dust with high efficiency without use of a filter which is a possible cause for many troubles.

It is also an object of this invention to provide a vacuum cleaning apparatus of simple structure utilizing only the weight and inertia of the dust and currents of air.

Another object of this invention is to provide a vacuum cleaning apparatus wherein the mixture of air and dust sucked in through the dust suction mouth is injected into a portion of the air-discharge hole of a dust hopper kept at a decreased pressure or into a portion adjacent the hole so as to cause the dust entrained in the air being discharged from the hopper to be returned to the hopper, enabling even a hopper of a small volume to offer sufficient dust-removing capacity.

Still another object of this invention is to provide a vacuum cleaning apparatus having a dust hopper of the minimum cross-sectional area required to prevent settling dust particles from being blown upward again.

It is similarly an object of this invention to provide a vacuum cleaning apparatus which is much simpler in operating principle and structure and which is less expensive, easier to handle, more troubleproof and more efficient than the conventional countertype and to provide a road sweeper which offers a dust collecting capacity exceeding 95%, an ability sufficient for a roadcleaning vehicle, without use of a filter.

In addition, this invention aims to enable various conventional separating devices to be improved in their efficiency and service life by the application of this invention to their designs.

Other objects and benefits of this invention will become apparent from the following description.

SUMMARY OF THE INVENTION

To accomplish the objects described above, the apparatus of the present invention comprises three principal components, i.e. a dust hopper for storing the dust separated from the mixture of air and dust sucked in through the dust suction mouth, an air discharge hole formed in said hopper so as to deliver the air inside this hopper to the vacuum source and an injection nozzle adapted to blow the dust-containing air sucked in through the dust suction mouth through a portion of said air-discharge hole into the hopper.

The interior of the dust hopper is generally vacant and holds no filter. The air-discharge hole is generally formed of a circular aperture and usually disposed on an upper part of the hopper. A device whereby the mixture of air and dust sucked in through the dust suction mouth is injected into or near this air-discharge hole to give birth to an injected current of air directed to the hopper interior constitutes itself the salient feature of the present invention. To be specific, this device comprises allowing an injection nozzle connected via a hose or some other tubular passage to the dust suction mouth to be disposed relative the air-discharge hole generally with the nozzle centered perfectly with the axis of the air-discharge hole so that both air and dust will be passed through the center of the air-discharge hole and injected into the hopper interior. In order that the tip of the injection nozzle may enable the whole mixture of dust and air forwarded from the dust suction mouth to be delivered into the hopper interior, the position of the nozzle tip should be finely adjusted to approach or slightly enter the air-discharge hole but not to project into the hopper of the air-discharge hole. As the suction created by the vacuum force causes the air inside the hopper, which is centripetally drawn from all directions, toward the air-discharge hole and then to be discharged from the air-discharge hole along a course which is relatively parallel to the stream of dust-laden air entering the hopper from the injection nozzle, the air being discharged is caused to change its course rapidly in the vicinity of the air-discharge hole. As a result, the dust contained in the air is caused by its larger inertia to follow a straighter path than the air which carries it and to fly into the peripheral zone of the air current blown through the injection nozzle into the hopper interior. The dust consequently returns to the hopper interior, so that air free of dust is discharged from the airdischarge hole toward the vacuum source.

The flow rate at which the slow current of air moves inside the hopper toward the air-discharge hole should be such that the volume of air introduced into the hopper within the unit time will be in equilibrium with the volume of air discharged out of the hopper. Since the flow rate of the slow current of air decreases in proportion as the cross-sectional area of the hopper increases, the dimensions and shape of the hopper will have to be so chosen that the slow current of air will not cause dust particles to drift off the course in which they are descending to settle.

If the injected current of air emanating from the injection nozzle is allowed to expand rapidly, it will rapidly lose its velocity and cause a turbulence of dust near the air-discharge hole of the hopper. This possibility may effectively be precluded by disposing in front of the injection nozzle a tubular member adapted to enclose the circumference of the injected current of air, with a space left to intervene between the nozzle tip and the tubular member. Since this member prevents the injected current of air from expanding in the circumferential direction, the current reaches a relatively long distance, so that the dust can fly to a fair distance because of the force of the air current coupled with the inertia of the dust.

Needless to say, the space interposed between the injection nozzle and the tubular member serves the purpose of permitting the dust which is entrained by the air within the hopper as it is drawn toward the air-discharge hole to fly into the exposed portion of the injected current of air. Because of the pressure exerted inwardly through the space by the highly concentrated current of air, the injected current of air cannot expand while in motion through this space. Rather, the injected current of air enters the tubular member as it admits the circumferential air.

DETAILED DESCRIPTION OF THE INVENTION

Figure 1:
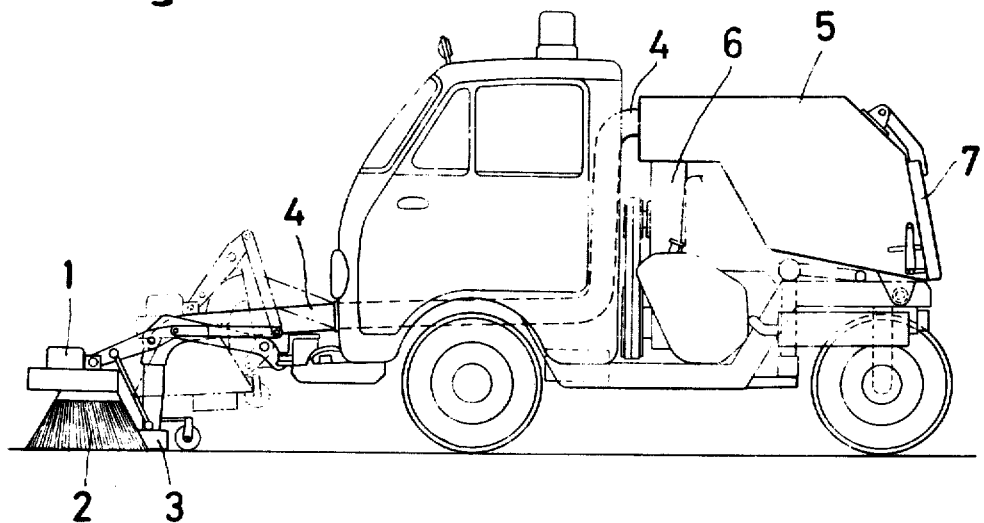
FIG. 1 is a side elevation illustrating in outline a road sweeper utilizing the apparatus according to this invention.

FIG. 1 illustrates one preferred embodiment of this invention applied to a road sweeper. A dust collection means constituted in the illustrated embodiment by a pair of gutter brooms (brushes) 2 disposed in lateral symmetry and rotated in opposite directions by a hydraulic motor 1 sweep dust on the road surface and collect it between the brooms. The dust thus collected is sucked in through a dust suction mouth 3 and sent through a duct constituted in the illustrated embodiment by hose 4 into a hopper tank 5. Denoted by 6 is a fan connected to air discharge hole 9 and serving as a vacuum source and by 7 an air-tight lid which is opened to permit removal of the dust collected in the hopper tank 5. The gutter brooms 2 and the dust suction mouth 3 disposed at the frontal portion of the sweeper are vertically movable by means of a suitable known means (not illustrated) as indicated by dotted lines.

Figure 2:
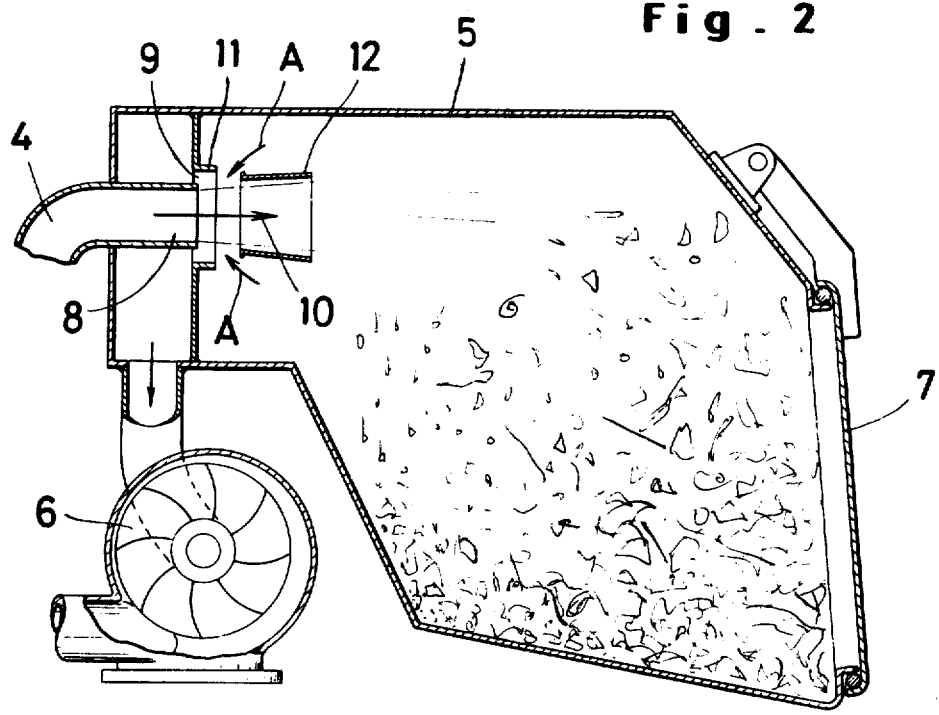
FIG. 2 is a longitudinal cross section of the apparatus according to this invention adopted in the road sweeper of FIG. 1.

The mixture of air and dust which has passed through the hose 4 and reached the hopper 5 is injected by an injection nozzle 8 through an air-discharge hole 9 in a wall of the hopper 5 into the hopper 5, forming an injected current of air 10, as illustrated in FIG. 2. Hose 4 is joined to injection nozzle 8. Inside the hopper 5, there is disposed nothing which functions in the way of a filter. The hopper 5 can be divided, if for some reason it is desired to do so, into a bottom portion for permitting the dust particles to settle and accumulate and an upper portion for introducing air through the dust suction mouth. The air-discharge hole 9 formed through the upper end wall of the hopper permits the air inside the hopper 5 to be attracted, as indicated by the arrow marks A toward the fan 6 serving as a vacuum source. In the illustrated example, the air-discharge hole 9 possesses a flange which protrudes into the hopper interior. The tip of the injection nozzle 8 does not extend past the tip 11 of this flange into the hopper interior but terminates a little short of the tip 11. The tip of the injection nozzle 8 should not extend past the tip 11 of the air-discharge hole because the whole of the air which has been drawn from within the hopper toward the air-discharge hole 9 is made to collide with the injected current of air before it is permitted to pass through the air-discharge hole on its way to the vacuum source. If the injection nozzle 8 extends past the air-discharge hole 9 into the hopper 5, then the air being drawn from within the hopper interior to the air-discharge hole 9 will collide with air along the outer periphery of the injected current of air from injection nozzle 8 as it proceeds through the air-discharge hole 9, making it impossible for the dust particles entrained by the air to fly into the injected current of air.

The injection nozzle 8 and the air-discharge hole 9 are concentrically disposed. The nozzle 8 causes the mixture of air and dust forwarded from the dust suction mouth to be injected into the central zone of air-discharge hole 9. Nozzle 8 has an area corresponding to about half the entire cross sectional area of the air-discharge hole 9 to generate an injected current of air 10. The area remaining outside the said central zone serves as the effective area for passage of discharge air through the air-discharge hole 9. Thus, the air inside the hopper cannot reach the fan 6 without passing through the space left in the air-discharge hole 9 between the tip 11 of the flange and the injected current of air 10.

In the current example, since the air to be discharged from within the hopper is required to pass through the air-discharge hole 9 at a velocity equalling that of the injected current of air 10, the current of air being discharged experiences a violent local turbulence adjacent the air-discharge hole 9. This current of air collides, as indicated by the arrow mark A, with the periphery of the injected current of air 10 and the dust particles entrained therein continue on a straighter course than the air that entrains them because of their larger inertia. The dust particles consequently fly into the circumferential zone of the current of air 10. Thereafter, the current of air takes a path around the injected current of air past the air-discharge hole 9. That is to say, while the air from within the hopper is forwarded past this narrow gateway to the fan 6, all the entrained particles having greater inertia than that of air are returned into the hopper 5. Although the interior of the hopper 5 is in a substantially static state, the air still contains floating dust particles which do not descend and settle. However, so far as these dust particles have greater inertia than that of air, they cannot escape confinement within the hopper interior because of the phenomenon described above.

As described above, the leading characteristic of this invention resides in the fact that, of the various kinds of dust injected together with air into the hopper, relatively light floating dust particles which are entrained by the air being drawn from within the hopper toward the vacuum source are prevented from being released into the atmospheric air. By this reason, the velocity at which the air from within the hopper 5 is attracted toward the air-discharge hole 9 must be such as to permit the entrained floating dust particles to acquire inertial force enough for them to fly into the current of air 10 being injected through the air-discharge hole 9 by the injection nozzle. The expression that the floating dust particles are made to fly into the injected current of air 10 also implies the velocity at which the air from within the hopper 5 is gathered to the air-discharge hole 9.

Although the velocity at which the air is thus gathered depends to some extent upon the magnitude of the suction created by the vacuum source, it is predominantly governed by the effective area of air discharge in the air-discharge hole 9, i.e., generally the difference between the entire cross-sectional area of the air-discharge hole and the cross-sectional area of the injected current of air.

Experimentally it has been confirmed that when the cross-sectional area of the injection nozzle is equal to the effective area of air discharge, the coefficient of dust collection, i.e. efficiency, reaches the maximum of 98%. Since the volume of the air entering the hopper and that of the air discharged from the hopper must be equal, the said equality between the two effective areas of air passage implies the condition that the injected current of air and the air being discharged through the air-discharge hole are of a substantially equal velocity and in opposite directions.

The first requirement to be fulfilled in practicing this invention is that the air-discharge hole 9 and the injection nozzle 8 both be circular in cross-section and that the cross-sectional area of the current of air issuing from the injection nozzle 8 occupy half the cross-sectional area of the air-discharge hole 9 while the injection nozzle is centrally disposed within hole 9. However, the fundamental principle of this invention consists in the fact that the air from within the hopper, while in the course of passing through the air-discharge hole, collides with the injected current of air and consequently enables the entrained dust particles to fly into the current of air by virtue of their inertial force. For this purpose, a modification in which the air-discharge hole is formed in an oblong rectangular shape and the injection nozzle of a similar shape is disposed in juxtaposition with the major side of the rectangle of the air-discharge hole, with the tip of the nozzle directed to the interior of the hopper, another modification in which two air-discharge holes are disposed one on each side of the injection nozzle and other similar modifications can be given to this invention optionally.

The injected current of air 10 issuing from the injection nozzle 8, while passing through the air-discharge hole 9, seizes the floating dust particles flying out of the discharge air and proceeds into the hopper. Unlike the travel through the hose, the current of air during the travel through the hopper interior is exposed to the action of vacuum attraction on its entire circumference so that it will rapidly expand and soon equilibrate in pressure with the air inside the hopper. There exists no force of vacuum suction which serves to drive the injected current of air forward. This injected current of air keeps its forward motion by virtue of the inertia created by the kinetic energy which is solely produced while the air is travelling through the hose. The expanded air encounters resistance offered by the air which is already moving gently inside the hopper toward the air-discharge hole, with the result that it will eventually be dispersed into the body of air thus in motion. The dust particles which are left behind have inertial force capable of more than offsetting the resistance offered by the air and descend, while describing a parabolic curve, to settle at the bottom of the hopper, at velocities varying with magnitudes of kinetic energy and gravitational force exerted thereon. On departure from the injection nozzle 8, the injected current of air 10 immediately begins to expand so that the air entraining the dust particles is scattered in all directions. This means that descent of dust particles from the current of air begins not far away from the air-discharge hole 9. If so, then some of the descending dust particles will have a chance of mingling into the current of air en route to the air-discharge hole 9. To preclude this possibility, a tubular member 12 adapted to enclose the circumference of the injected current of air is hung in front of the injection nozzle 8 and the air-discharge hole 9, with a space left to intervene between the tip of the flange 11 and the member 12. This tubular member 12 keeps the injected current of air 10 from expanding in the circumferential direction, retains the motion of the current of air entraining the dust particles and consequently prevents the descent of dust particles from occurring early. The incorporation of this tubular member 12 has an additional benefit of having the air in the space between the tip of the flange of the air-discharge hole and the tubular member attracted into the tubular member 12, adding to the length of the stable portion of the injected current of air 10. This is advantageous also in the sense that the surface area of the injected current of air available for seizure of dust particles flying in through the said space is increased.

Owing to the seizure by the injected air current 10 of floating dust particles entrained in the discharge air, this invention enables a dust hopper of a small volume to provide a high dust collecting efficiency. The condition in which large dust particles float in the air moving toward the air-discharge hole 10 is not desired. Such condition cannot possibly be caused by the injected air current. It occurs when the air moving inside the hopper in a direction opposite that of the injected current of air is so powerful as to cause the descending dust particles to drift in the direction of the air-discharge hole 9. This possible drifting can be prevented by keeping the velocity of air movement inside the hopper from rising too high. The velocity of the air movement inside the hopper can be obtained by dividing the volume of air discharged through the fan 6 per unit time by the cross-sectional area of the hopper. In the illustrated example, therefore, the hopper has only to be designed in such a shape that the area of a cross section taken at any point in parallel to the end wall will not be smaller than that which gives the appropriate velocity of air movement.

Prior to conducting an actual experiment with this apparatus, the fear was entertained that dust particles of light weight might remain suspended, dancing in the current of air inside the hopper. An experiment has, however, confirmed perfect absence of such phenomenon. The inventor clad in a diver's suit actually entered the hopper tank of a road sweeper and personally confirmed, through visual observation, the absence of the said phenomenon.

To this point, the present invention has been described with respect to a working example of the apparatus applied to a road sweeper. It should be noted that the vacuum separation apparatus, namely, the fundamental mechanism of the present invention, which consists in causing the mixture of air and dust drawn through the dust suction mouth to be injected through the air-discharge hole formed in the dust hopper wall can be designed in various ways. Further, the said mechanism of this invention, if incorporated on the suction side of a filter type cleaner, will serve to minimize the amount of dust to be delivered to the filter and therefore, improve the operating efficiency and lengthen the service life of the cleaner. The present invention can easily be applied to the conventional separating machines so as to enhance their performance to a pronounced extent.

What is claimed is:

1. An apparatus for separating air and dust comprising, in combination, a closed dust hopper disposed to receive and store dust separated from a mixture of air and dust, an air-discharge hole having a flange projecting into said hopper and disposed within a wall of the hopper, an air and dust injection nozzle positioned within said air-discharge hole in coaxial relationship and projecting into said hopper to a lesser extent than said flange, said dust injection nozzle having a cross section similar to that of the air discharge hole and having a cross-sectional area half the cross-sectional area of said air discharge hole, a tubular member coaxial with the dust injection nozzle and disposed within the hopper in front of the dust injection nozzle and spaced from said flange of said air discharge hole to enclose the air current projecting from said dust injection nozzle and to guide air and dust projecting from the said injection nozzle to the hopper, a vacuum pump means joined to said air-discharge hole, and a dust collection means, a duct leading from said dust collection means to said dust injection nozzle, whereby dust-containing air passing into the duct is injected into the hopper and separated, the separated dust being collected within the hopper, with the air being removed between the air-discharge hole and said dust injection nozzle.

2. The apparatus of claim 1 wherein the cross-sectional area of the dust injection nozzle and the cross-sectional area of the air-discharge hole are circular.

* * * * *